(12) United States Patent
Guy et al.

(10) Patent No.: US 6,582,114 B1
(45) Date of Patent: Jun. 24, 2003

(54) ROTATING FIBER FLASHER SYSTEM

(75) Inventors: James K. Guy, Mesa, AZ (US); Brian B. Scanlan, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/015,081

(22) Filed: Dec. 11, 2001

(51) Int. Cl.[7] .................................................. G02B 6/04
(52) U.S. Cl. ....................... 362/554; 362/551; 362/287; 362/418
(58) Field of Search ................................. 362/551, 554, 362/287, 418, 559, 540, 542, 479, 493, 321, 269; 385/25, 38, 31, 47, 147, 901

(56) References Cited

U.S. PATENT DOCUMENTS

| | | | |
|---|---|---|---|
| 3,599,115 A | * | 8/1971 | Beezley ........................ 385/25 |
| 5,487,619 A | | 1/1996 | Winebrenner |
| 5,602,948 A | | 2/1997 | Currie |
| 5,631,625 A | | 5/1997 | Moergelin et al. |
| 5,691,696 A | | 11/1997 | Mazies et al. |
| 5,877,681 A | | 3/1999 | Williams et al. |

FOREIGN PATENT DOCUMENTS

| WO | WO 99/39135 | * 8/1999 | ............. F21V/8/00 |
|---|---|---|---|

* cited by examiner

*Primary Examiner*—Sandra O'Shea
*Assistant Examiner*—Guiyoung Lee
(74) *Attorney, Agent, or Firm*—Harness Dickey & Pierce, P.L.C.

(57) ABSTRACT

A rotating fiber flasher system is provided that supports a light guide or plurality of light guides capable of accepting energy from a light source and transmitting that energy to a plurality of optical fibers supported by a manifold. The system produces a light flash by illuminating the optical fibers successively as the light guide rotates. The optical fibers transmit the optical flashes to a luminaire which refracts or reflects the optical flashes about a desired arc. The fiber flasher system allows an optical signal to be periodically generated in a plurality of directions around a 360° path, and requires less power to operate than systems which attempt to provide optical illumination about an entire 360° arc continuously, 2π steradian hemisphere or 4π sphere.

15 Claims, 3 Drawing Sheets

ROTATING FIBER FLASHER SYSTEM

FIELD OF THE INVENTION

The present invention relates generally to the transmission of light and, more particularly, to an apparatus and method for generating a periodic optical signal about a 360° arc.

BACKGROUND OF THE INVENTION

It is common to use flashes of light to create an image, attract the attention of an observer or as a warning device. However, most high intensity flasher systems use a pulse of light generated by a lamp driven by a capacitor discharge system. The electrical energy is stored in the capacitor and then released to the bulb through the use of timing electronics. The bulb radiates in all directions (i.e., in $4\pi$ steradians) which requires a large amount of energy in order for the intensity to be such that an observer can see it from a significant distance such as several hundred meters or more. Additionally, the current capacitive discharge systems sacrifice bulb life due to the transient nature of the discharge cycling. Still, another disadvantage of the current discharge type flashers is that they are limited in flash rate due to the charge/discharge cycle of the capacitors.

Accordingly, there remains a need for a low cost, light weight and efficient solution for a remote source optical flasher system which is suitable for use on various forms of vehicles, or even stationary structures such as buildings, and which operates more efficiently as an optical warning signal than previously developed optical warning devices.

SUMMARY OF THE INVENTION

The foregoing drawbacks are overcome by a rotating fiber flasher system in accordance with preferred embodiments of the present invention. The rotating fiber flasher system overcomes the aforementioned disadvantages as well as other disadvantages by producing an optical signal from an optical signal source which is input to at least one light guide which is supported by a support member. The light guide is positioned with its input end facing the optical source. The light from the optical signal source is directed by the light guide toward a plurality of optical fibers housed within a manifold. Successive flashes of light are transmitted through each of the plurality of optical fibers of the manifold by rotating the light guide relative the face of the optical fibers in the manifold. The light guide thereby enables the light from the input source to be directed to each of the optical fibers by means of a motor driven assembly which continuously rotates the support member supporting the light guide. By selectively controlling the speed of rotation of the motor driven assembly, the light from the input source can be scanned in a circular path across the optical fibers, thereby transmitting an optical signal into each fiber. The optical signals are then applied to a lens type illumination element. The illumination element causes the optical signal to be refracted or reflected therefrom at a predetermined angle, depending on which specific optical fiber provided the optical signal. As the support member is rotated, the optical signals passed through the optical fibers impinge the illumination element at different positions on the element, which produces flashes of light which are directed in a 360° arc. To an observer, this appears as a periodic light flash at a given location.

The present invention thus operates with greater efficiency than previously developed optical flashing systems because the entire energy of the source signal is focused in only one direction at a given moment, rather than used to illuminate an entire hemispherical area ($2\pi$ steradians) continuously. Thus, a less powerful optical source can be used while the system is still able to provide an optical signal of sufficient strength to be visible at significant distances.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
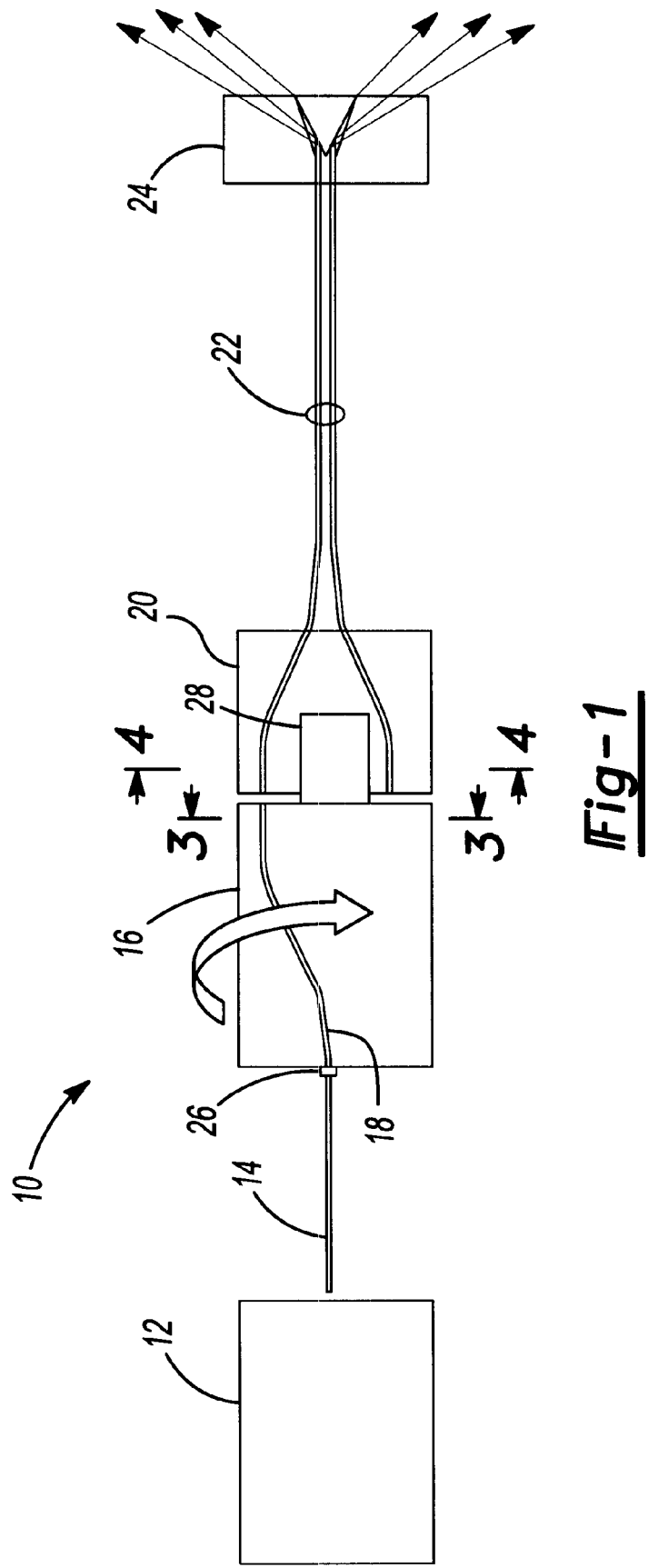
FIG. 1 is a side view a of the preferred embodiment of an optical flashing apparatus in accordance with the present invention.

With reference to FIG. 1 of the drawings, a rotating fiber flasher apparatus 10 constructed in accordance with the teachings of the preferred embodiment of the present invention is shown. Apparatus 10 is shown to generally include a light source 12, a feed fiber 14, a support member 16, a light guide 18 housed within the support member 16, a manifold 20 having a plurality of optical fibers 22, and an illumination element 24. The light source 12 comprises a light emitting diode (LED) or a laser diode that emits an incoherent beam of light. The light source 12 is positioned is such a way as to impart its energy on the face (i.e., input end) of the feed fiber 14. As those skilled in the art will understand, a gap between the light source 12 and feed fiber 14 are preferably controlled to be both uniform and as small as possible to prevent light loss prior to its entering the feed fiber 14.

The light guide 18, such as a conventional fiber optic cable, is disposed within the support member 16 during manufacture of the support member, such as by an injection molding process. The light guide 18 may be attached to the feed fiber 14 with an interface 26 such as a ball lens or gradient lens. The support member 16 rotates by use of a micro motor 28 at a rate conducive to the desired flash rate (i.e., 1 Hz flash rate=1 revolution/second). The energy from the light source 12 is discharged through the light guide 18 towards a plurality of optical fibers 22 that are supported in manifold 20. The optical fibers 22 are arranged in a circle, when viewed end-wise, thereby allowing light from the light guide 18 to be scanned across the face of each of the fibers 22 in a pulse like manner. As support member 16 is rotated, the optical signals passing through the optical fibers 22 impinge the illumination element 24 at different positions on the element which produces pulses, or "flashes", of light which are directed about a 360° arc. The optical fibers 22 may alternatively be formed such that their ends extend into the illumination element 24. The illumination element 24 may comprise a luminaire or an equivalent component made of an acrylic, polycarbonate or similar diffuse material capable of dispersing light into the hemisphere.

Figure 3:
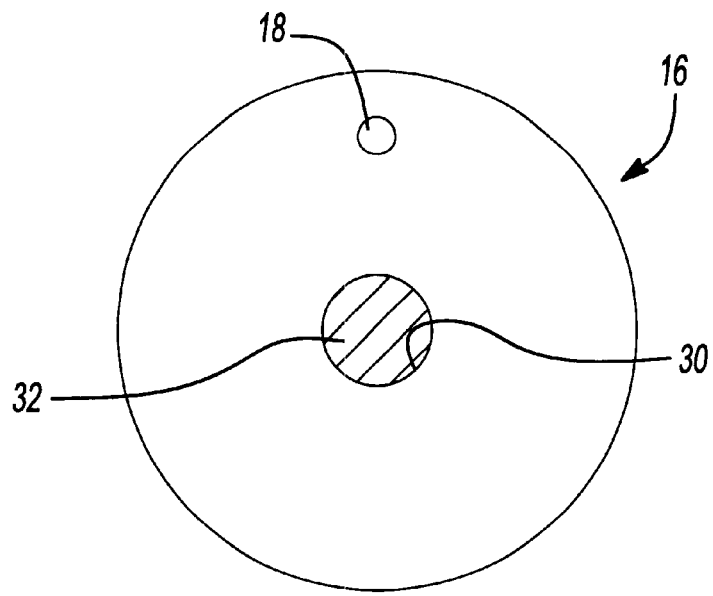
FIG. 3 is a cross-sectional end view of the support member of FIG. 1 taken along section 3—3 in FIG. 1.

With reference to FIG. 3 of the drawings, a cross-sectional end view of the support member 16 is introduced. The support member 16 includes a coaxial bore 30 which receives an output shaft 32 of the micro motor 28. The output shaft 32 rotates the support member 16 at a rate necessary to produce the desired flash rate (i.e., 1 Hz flash rate=1 rev/sec).

Figure 4:
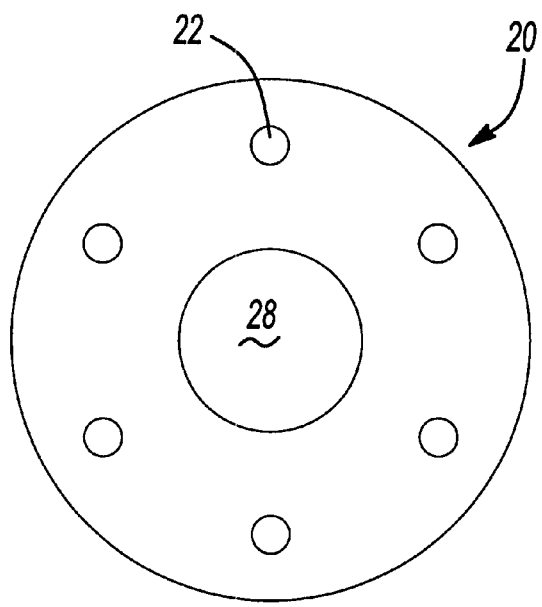
FIG. 4 is a cross-sectional end view of the manifold of FIG. 1 taken along section 4—4 in FIG. 1.

With reference to FIG. 4 of the drawings, a cross-sectional end view of the manifold 20 is shown. Manifold 20 includes a coaxial bore 34 which houses the micro motor 28. The optical fibers 22 are orientated in a circular array inside manifold 20. The micro motor 28 rotates support member 16 (shown in FIG. 3) thereby allowing the light from the light guide 18 (shown in FIG. 3) to be scanned across the face (i.e. input end) of optical fibers 22 in a pulse like manner.

Figure 2:
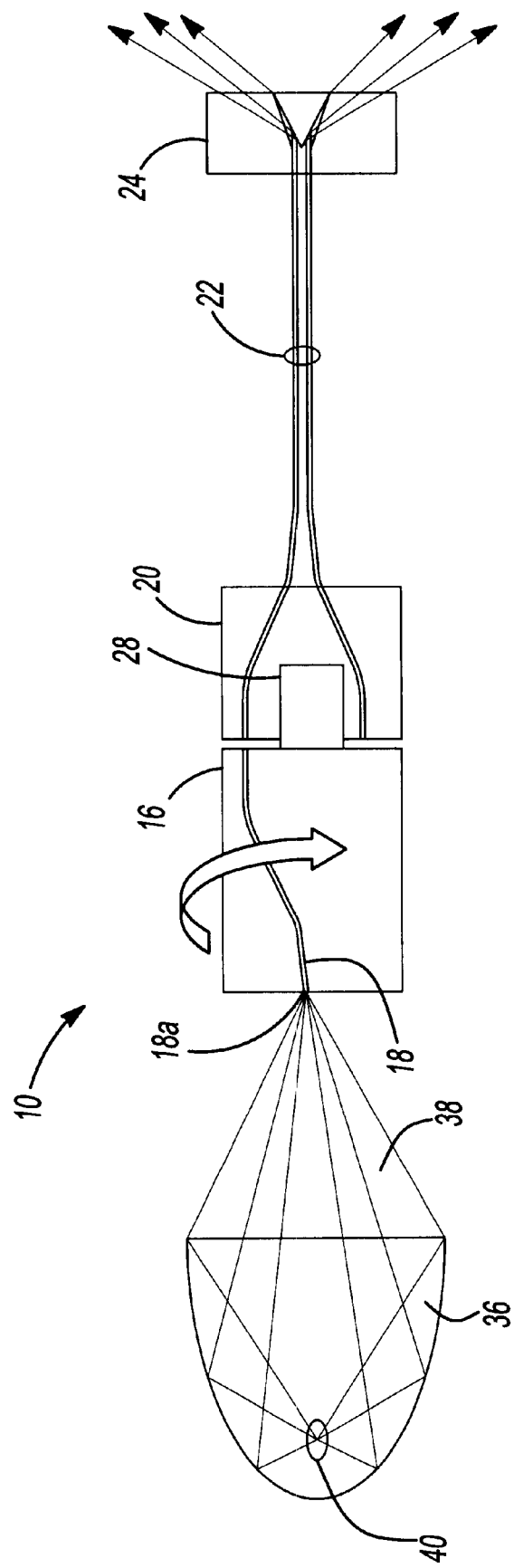
FIG. 2 is a side view of an optical flashing apparatus showing another method for producing a light flash using a constant light source.

With reference to FIG. 2 of the drawings, an alternate embodiment of the rotating fiber flasher system 10 is shown. This embodiment is identical in construction and operation to system 10 with the exception of the use of a light reflector 36. The reflector 36, which may comprise an ellipsoidal reflector or parabolic reflector, with condenser lens focuses light 38 from a constant light source 40 onto the exposed face 18a of the light guide 18.

It will be appreciated that while constant light sources have been described herein as the optical signal generating sources, that it is possible to use a light source that produces a intermittent optical signal. However, it is anticipated that such a light source would still require a frequency sufficiently high such that each of the optical fibers 22 are sure to be illuminated as the support structure 16 rotates.

In accordance with the present invention, a method and apparatus of directing a constant source light to a support member that creates the appearance of on and off flashes of light to attract the attention of an observer at any point in time is provided. The system of the present invention advantageously focuses the entire output of a constant light source into each one of a plurality of optical fibers, in successive fashion, to thereby more efficiently utilize the optical energy.

In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. An apparatus for generating a flashing optical signal about a predefined arc, comprising:
    a light source for generating an optical signal;
    a support member;
    a motor for rotating said support member;
    at least one first light transmitting element supported by said support member for receiving said optical signal, said at least one first light transmitting element being supported such that an input end thereof is disposed so as to be in general longitudinal alignment with said light source, while an output end of said first light transmitting element is radially displaced from said input end;
    a manifold having a plurality of second light transmitting elements arranged about a longitudinal axis of said manifold, an input end of each of said second light transmitting elements being arranged so as to periodically receive said optical signal from said first light transmitting element as said support member is rotated by said motor; and
    an illumination element for receiving said optical signal from an output end of each of said second light transmitting elements and generating a pulsing flashing optical signal that moves rotationally about a predefined arc.

2. The apparatus of claim 1 wherein said optical fibers are arranged in a circle about said longitudinal axis of said manifold.

3. The apparatus of claim 1 wherein said input ends of said optical fibers of said manifold form a circle having a larger diameter than said output ends of said optical fibers.

4. The apparatus of claim 1 wherein said predefined arc comprises a 360 degree arc.

5. The apparatus of claim 1 wherein said illumination element comprises a conical recess centered about a longitudinal axis thereof for refracting said optical signal about a 360 degree arc.

6. The method of claim 1 wherein said first light transmitting element comprises a light guide.

7. The method of claim 1 wherein said second light transmitting element comprises an optical fiber.

8. An apparatus for generating a flashing optical signal directed about a predefined arc, comprising:
    a light source for generating an optical signal;
    a support member having at least one first light transmitting element responsive to an output of said constant light source, and input end of said first light transmitting element being aligned with said light source to continuously receive said optical signal from said light source, an output end of said one first light transmitting element being offset axially from said input end thereof;
    a system for rotating said support member;
    a manifold disposed closely adjacent said support member and having a plurality of second light transmitting elements extending longitudinally therethrough about a central longitudinal axis of said manifold, and extending outwardly from said manifold, said second light transmitting elements each having an input end for receiving said optical fibers from said first light transmitting element, and an output end; and
    an illumination element responsive to said optical signal transmitted through said second light transmitting elements of said manifold, said illumination element operating to refract said optical signal in a plurality of directions about a predetermined arc as said support member is rotated, thereby producing a periodic flashing optical signal about said predetermined arc, wherein each occurrence of said flashing optical signal includes the full amount of optical energy of said optical signal.

9. The apparatus of claim 8 further comprising a reflector for receiving said optical signal from said light source and producing focused light rays towards said light guide.

10. The method of claim 8 wherein said first light transmitting element comprises a light guide.

11. The method of claim 8 wherein said second light transmitting element comprises an optical fiber.

12. A method for producing a flashing optical signal that sweeps a predefined arc, comprising:
    using a light source to generate a continuous optical signal;

transmitting said continuous optical signal through a first light transmitting element disposed within a support member, wherein an input end of said first light transmitting element is laterally offset, relative to a central longitudinal axis of said support member, from an output end of said first light transmitting element;

rotating said support member about said central longitudinal axis so that said output end of said first light transmitting element is swept about a predefined arc;

using a manifold having a plurality of second light transmitting elements extending longitudinally therethrough, and further arranged about an axial center of said manifold, to receive said continuous optical signal at input ends thereof and generate cyclic optical pulses at output ends thereof; and using an illumination device to receive said optical pulses from said second light transmitting elements and to direct said cyclic optical pulses about a predefined arc to produce a cyclic, flashing optical signal.

13. The method of claim 12 wherein the steps of rotating said support member about said central longitudinal axis so that said output end of said first light transmitting element is swept about a predefined arc can be controlled at a rate conducive to a designed flash rate.

14. The method of claim 12 wherein said first light transmitting element comprises a light guide.

15. The method of claim 12 wherein said second light transmitting element comprises an optical fiber.

* * * * *